(12) United States Patent
Chen et al.

(10) Patent No.: US 9,355,202 B2
(45) Date of Patent: May 31, 2016

(54) PROMOTING EFFICIENT CELL USAGE TO BOOST QOR IN AUTOMATED DESIGN

(71) Applicant: Taiwan Semiconductor Manufacturing Co., Ltd., Hsin-Chu (TW)

(72) Inventors: Huang-Yu Chen, Zhudong Township (TW); Ya Chen Wang, Taichung (TW); Tan-Li Chou, Zhubei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1 day.

(21) Appl. No.: 14/072,060

(22) Filed: Nov. 5, 2013

(65) Prior Publication Data

US 2015/0128101 A1 May 7, 2015

(51) Int. Cl.
*G06F 9/455* (2006.01)
*G06F 17/50* (2006.01)

(52) U.S. Cl.
CPC .......... *G06F 17/5072* (2013.01); *G06F 17/505* (2013.01); *G06F 17/5045* (2013.01); *G06F 17/5077* (2013.01)

(58) Field of Classification Search
USPC .......................................... 716/132
See application file for complete search history.

(56) References Cited

U.S. PATENT DOCUMENTS

| | | | |
|---|---|---|---|
| 7,552,409 B2 | 6/2009 | Kucukcakar et al. | |
| 2004/0243374 A1 | 12/2004 | Kundert | |
| 2006/0136856 A1 | 6/2006 | Tang et al. | |
| 2009/0199136 A1* | 8/2009 | Reis et al. | 716/2 |
| 2013/0154128 A1 | 6/2013 | Wang et al. | |
| 2013/0318488 A1* | 11/2013 | Iyer et al. | 716/108 |

FOREIGN PATENT DOCUMENTS

| | | |
|---|---|---|
| TW | I349864 | 10/2011 |
| TW | 201317819 A | 5/2013 |

* cited by examiner

*Primary Examiner* — Eric Lee
(74) *Attorney, Agent, or Firm* — Eschweiler & Associates, LLC

(57) ABSTRACT

A method of designing integrated circuits includes forming a restricted cell library from a first cell library by selecting only those cells in the first cell library that are most efficient according to predetermined efficiency criteria and executing an integrated circuit design operation in an electronic design automation program while directing the electronic design automation program to make cell selections exclusively from the restricted cell library. The integrated circuit design operation is one that can be directed to make cell selections from any of the cells in the first cell library without changing its essential purpose. The method improves QoR for the resulting circuit design.

20 Claims, 3 Drawing Sheets

PROMOTING EFFICIENT CELL USAGE TO BOOST QOR IN AUTOMATED DESIGN

FIELD

The present disclosure relates to systems and methods for designing integrated circuit devices.

BACKGROUND

Modern integrated circuits typically include thousands of components having complex interrelationships. These circuits are generally designed using highly automated processes known as electronic design automation (EDA). EDA begins from a functional specification provided in a hardware description language (HDL) and continues through the specification of a circuit design including the specification of elementary circuit components called cells, the physical arrangement of the cells, and the wiring that interconnects the cells.

EDA can be divided into a series of stages such as synthesis, placement, routing, and engineering change order (ECO) processing. Each of these steps can involve selecting cells from a library of cells. Typically, a very large number of different circuit designs using various cell combinations can meet a functional specification for a circuit.

DETAILED DESCRIPTION

Circuit designs meeting an HDL specification can vary widely in merit. Aside from basic design constraints, there are a variety of different performance objectives relating to such matters as performance, power, signal integrity, reliability, and yield. Because of the large number of possibilities and the computational requirements of evaluating the constraints and objective functions, the problem of specifying an optimal design is mathematically intractable. Even the individual stages of synthesis, placement, routing, and engineering change order (ECO) processing are generally mathematically intractable. Mathematically intractable means that an optimum exists but cannot be ascertained within a feasible period of time. Accordingly, the quality of result (QoR) obtained from a design process will depend on the algorithms applied by the design process. There exists a long felt need for design processes and EDA tools that achieve higher QoR at fixed cost in terms of computational resources and time.

The inventors have found that by restricting cell selections to cells meeting predetermined efficiency criteria at various stages of an EDA process, QoR can be substantially improved. The process stage can be any EDA process stage in which cells are selected from a library. The efficiency criteria can be any efficiency criteria that sets preferences among cells that perform equivalent functions.

Figure 1:
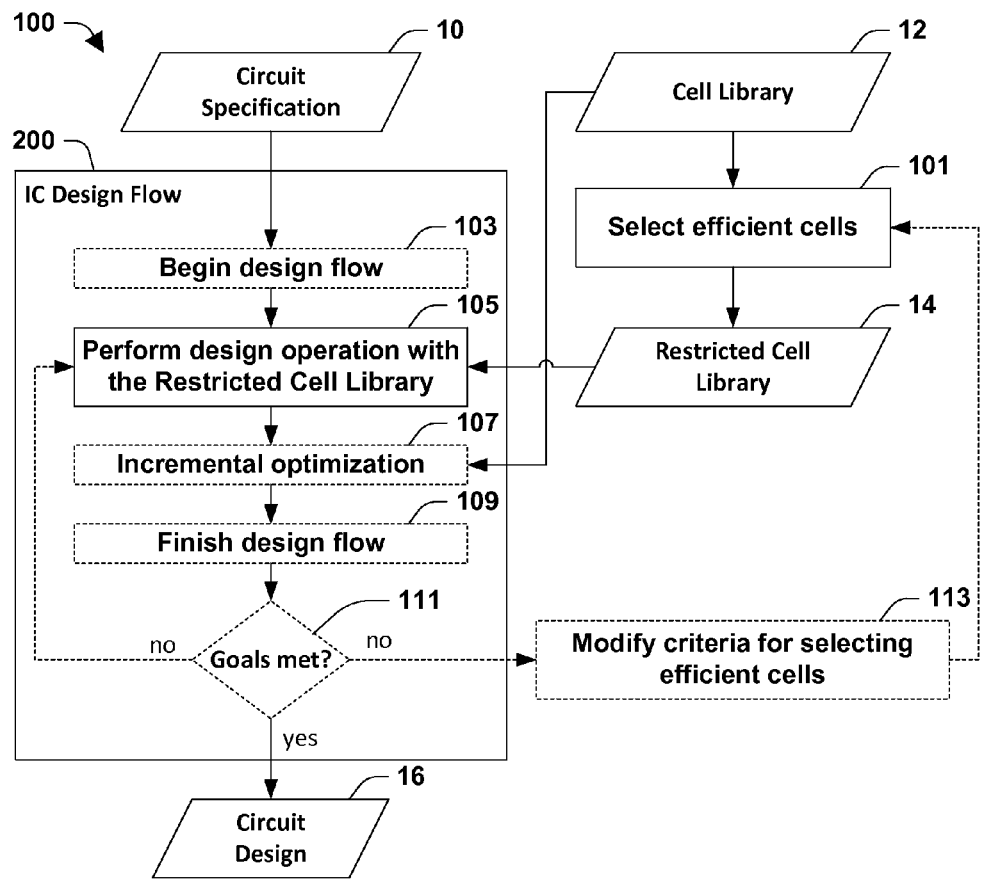
FIG. 1 is a flow chart of a process according to an embodiment of the present disclosure.

FIG. 1 is a flow chart of a process 100 according to an embodiment of the present disclosure. Process 100 has inputs including an HDL specification 10 and at least one cell library 12. The output of process 100 is a circuit design 16. Process 100 includes act 101, which selects the most efficient cells from cell library 12 to produce a restricted cell library 14. The most efficient cells are the most efficient among comparable cells in cell library 12 in terms of predetermined efficiency criteria. The selection process 101 excludes some cells in cell library 12 from cell library 14.

In some embodiments, the efficiency criteria includes one or more efficiency metrics. An efficiency metric can be any suitable metric. In some embodiments, an efficiency metric is an area-specific efficiency metric. Examples of area efficiency metrics include delay/area, leakage/area, $\Delta$delay/$\Delta$area, and $\Delta$leakage/$\Delta$area. Other examples of efficiency metrics include, without limitation, $\Delta$delay/$\Delta$leakage and delay/leakage. Delay values relate to performance and can be any suitable measure of the delay introduced by the cell. In some embodiments, a delay is a maximum among the timing table entries used to approximate a cell's timing arcs or a predetermined subset of those entries. A timing table can be, for example, a 7×7 timing table. A subset of the 7×7 timing table entries can be, for example, the 2×2 through 5×5 entries, which subset could be chosen to exclude extreme conditions.

$\Delta$-values are values determined by comparison to reference cells. The reference cells can be any suitable reference cells. In some embodiments, there is one reference cell for each cell group. The reference cell could be, for example the smallest cell in the cell group or the one having lowest current drive. A cell group is a group of cells all having the same function, for example implementing a logical operation such as AND, OR, NOR, or XOR applied to a pair of inputs. A group can be further restricted by one or more additional requirements, such as a requirement that all the cells in the group have a particular voltage threshold.

In some embodiments, the reference cell is the next cell up or down in a hierarchical ordering of cells in a cell group. The hierarchy could be based, for example, on cell area or current drive. In some embodiments, the reference cells are a separate group of cells having a one-to-one correspondence to the cells in the cell group. For example, the cell group being evaluated can be a group having a first voltage threshold, the group of reference cells can be a group having a second voltage threshold, and the one-to-one correspondence can be generated by matching cells having the same current drive capability.

Table 1 provides an example of a cell group evaluated according to a metric relating to area-specific efficiency. The cells in the group are ordered according to current drive. Each cell, except the first, is evaluated in comparison to the cell having next lowest current drive. The metric relates to the ratio between reduction in delay and increase in area in replacing the cell having the next lowest current drive with the cell being evaluated. The metric is compared against a threshold of 0.1. The two cells having highest current drive are excluded as not meeting the threshold. Restricted cell library 14 would therefore be formed using only the first four cells in the Table 1.

TABLE 1

| Cell | Comparison Cell | maxΔ\|delay\| | Δarea | $\frac{\text{max}\Delta\|\text{delay}\|}{\Delta\text{area}}$ | not ≤0.1? |
|---|---|---|---|---|---|
| AN2D1 | n/a | | | | Yes |
| AN2D2 | AN2D1 | 0.074 | 0.121 | 0.610 | Yes |
| AN2D4 | AN2D2 | 0.062 | 0.486 | 0.128 | Yes |
| AN2D6 | AN2D4 | 0.031 | 0.244 | 0.126 | Yes |
| AN2D8 | AN2D6 | 0.029 | 0.486 | 0.059 | No |
| AN2D16 | AN2D8 | 0.050 | 1.457 | 0.034 | No |

Table 2 provides an example of a cell group evaluated according to a metric relating to leakage reduction efficiency. The cells in the group are ordered according to current drive. The cells in the group are all low voltage threshold cells. Each cell is evaluated in comparison to a standard voltage threshold cell having the same current drive. The metric relates to the ratio between reduction in delay and increase in leakage achieved by using the low voltage threshold cell in place of a standard voltage threshold cell. The metric is compared against a threshold of 0.0005. The two cells having highest current drive are excluded as not meeting the threshold. Restricted cell library 14 would therefore be formed using only the first two cells in the Table 2.

TABLE 2

| Cell | Comparison Cell | maxΔ\|delay\| | Δleakage | $\frac{\text{max}\Delta\|\text{delay}\|}{\Delta\text{leakage}}$ | not ≤0.0005? |
|---|---|---|---|---|---|
| AN2D1 LVT | AN2D1 SVT | 0.015 | 12.08 | 0.00122 | Yes |
| AN2D2 LVT | AN2D2 SVT | 0.014 | 17.51 | 0.00080 | Yes |
| AN2D4 LVT | AN2D4 SVT | 0.012 | 36.70 | 0.00033 | No |
| AN2D6 LVT | AN2D6 SVT | 0.014 | 47.79 | 0.00029 | No |

Process 100 uses the restricted library 14 to perform the design operation of act 105 within design flow 200. The design operation 105 is one that is functional using the unrestricted cell library 12, however, in the present disclosure the design operation of act 105 is carried out while constraining cell selections to the restricted library 14.

While the design operation of act 105 can be the first operation in design flow 200, design flow 200 optionally includes design operations that are carried out before act 105. Accordingly, the process 100 includes an optional act 103, beginning the design flow 200. Where act 103 is included, the input to act 105 is the output of act 103. Accordingly, in some embodiment the input to act 105 can be other than the circuit specification 10. The input to act 105 can be a circuit layout in any suitable computer-aided design format. Depending on the design operation of act 105, a suitable computer-aided design format can be, for example, one or more files in one or more formats such as Library Exchange Format (LEF), Design Exchange Format (DEF), Milkyway database file format, SPICE file format, Circuit Description Language (CDL) file format, and Graphic Database System (GDSII) stream file format. In some embodiments, the input to act 105 is a chip design, which can be a design retrieved from a chip design database. Design flow 200 can include additional design operations 109 to produce circuit design 16.

Figure 2:
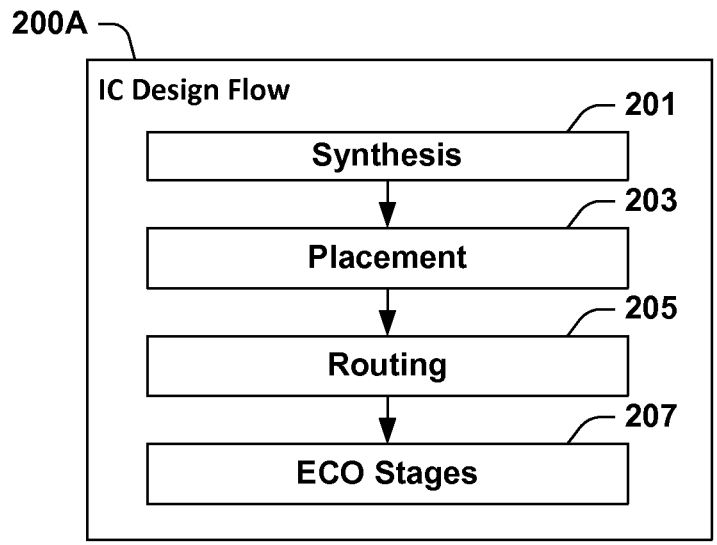
FIG. 2 is a flow chart of an example design flow.

Design flow 200 can be any suitable design flow. The design operation of act 105 can be any operation within the design flow 200 in which cell selections are made. FIG. 2 provides a flow chart of an example design flow 200A. Design flow 200A includes acts of synthesis 201, placement 203, routing 205, and engineering change order processing 207. Accordingly, the design operation of act 105 can be any of a synthesis operation, a placement operation, a routing operation, and an engineering change order operation. A design flow 200 typically includes at least synthesis, placement, and routing.

Figure 3:
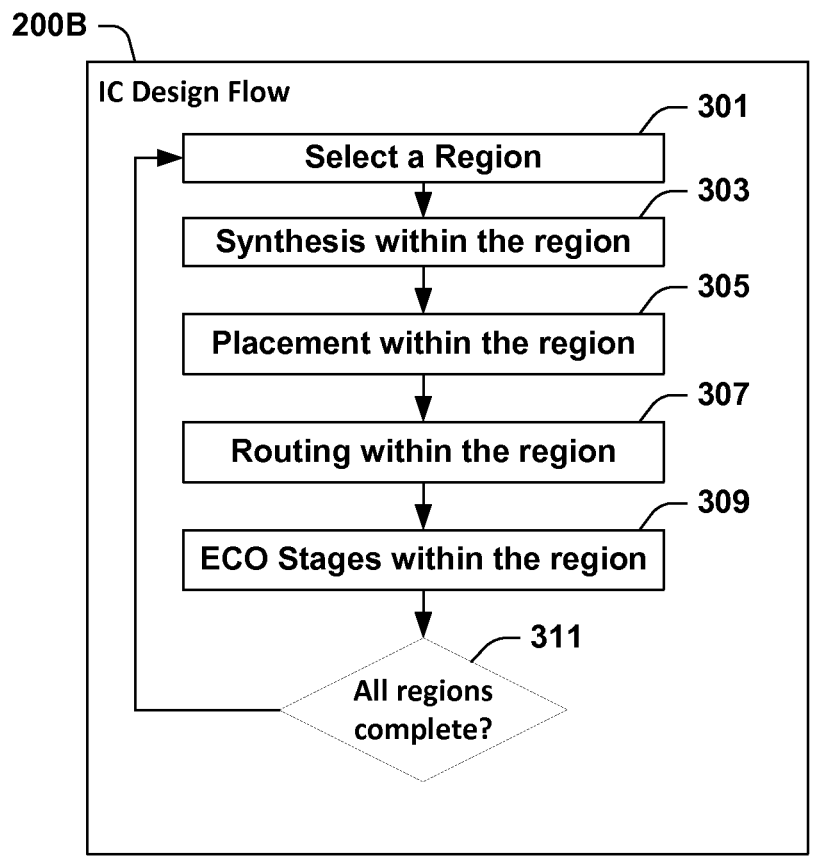
FIG. 3 is a flow chart for another example design flow.

FIG. 3 provides a flow chart of a process 200B, which is another example design flow. In the process 200B, the circuit specification 10 is divided into regions. Act 301 selects one region. Acts 303, 305, 307, and 309 apply operation of synthesis, placement, routing, and ECO stages respectively to that region. Act 311 continues the process 200B until all regions have been completed. Accordingly, in some embodiments the design operation of act 105 is applied to a single region, or one region at a time, among a plurality of regions in a circuit design or circuit specification.

In some embodiments, the design operation of act 105 is, or is part of, an optimization stage within the design flow 200. An optimization stage can be, for example, an area-efficient synthesis stage, an area-efficient placement stage, an area-efficient routing stage, an area-efficient ECO stage, a power-efficient synthesis stage, a power-efficient placement stage, a power-efficient routing stage, a power-efficient ECO stage, or a leakage-efficient LVT swap. The cell selections made by act 101 are, however, more than those required for the essential purpose of the design operation of act 105. The design operation of act 105 is one that would be functional without the cell restrictions imposed by act 101. For example, if the design operation of act 105 is an LVT swap, then act 101 does not merely select low voltage threshold cells from the cell library 12. For example, if the design operation of act 105 is an LVT swap, act 101 can select leakage-efficient LVT cells from among all LVT cells as illustrated by Table 2.

In some embodiments, a design stage implemented by act 105 includes logic-level optimization and is augmented with act 107, an incremental optimization 107. An incremental optimization is a gate-level optimization. Incremental optimization 107 is optional to process 100, which is illustrated by a dashed border in FIG. 1. Incremental optimization 107 relates to the same design stage as act 105, but makes cell selections from the cell library 12 without the restrictions applied by act 101. Incremental optimization 107 can increase the likelihood that circuit design 16 satisfies threshold criteria and can improve QoR for circuit design 16. While incremental optimization 107 introduces to the circuit design 16 cells that are excluded by act 101 from the restricted cell library 14, the resulting circuit design 16 is generally different and has a higher QoR than if the design operation of act 105 were to use the unrestricted cell library 12.

Figure 4:
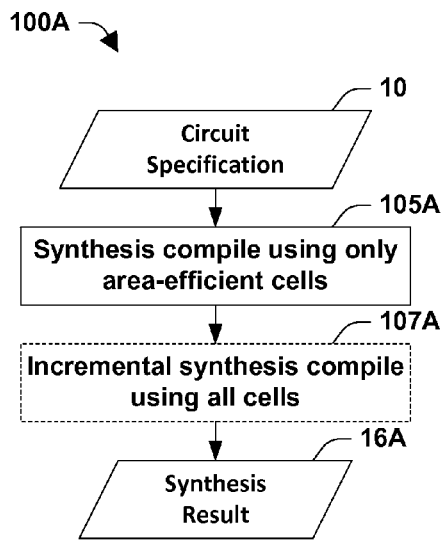
FIG. 4 is a flow chart of an example process according to an embodiment of the present disclosure that is within the scope of the process of FIG. 1.

FIG. 4 provides a flow chart of a process 100A, which is an example of embodiments of process 100 that include incremental optimization 107. In process 100A, the design operation 105 is a synthesis compile 105A that uses only area-efficient cells from the cell library 12. Act 107A is an incremental synthesis compile that uses the entire cell library 12. Accordingly, synthesis result 16A generally includes cells from the cell library 12 that do not satisfy the criteria applied by act 101, which forms restricted library 14.

Figure 5:
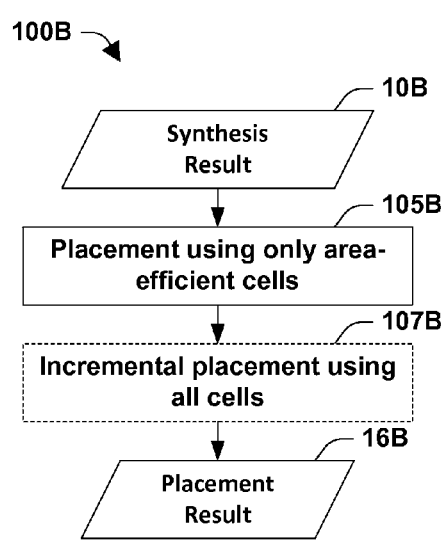
FIG. 5 is a flow chart of an example process according to another embodiment of the present disclosure that is within the scope of the process of FIG. 1.

FIG. 5 provides a flow chart of a process 100B, which is another example of embodiments of process 100 that include incremental optimization 107. In process 100B, the design operation 105 is a placement 105B that uses only area-efficient cells from the cell library 12. Act 107B is an incremental placement operation that uses the entire cell library 12. The placement result 16B generally includes cells from the cell library 12 that do not satisfy the criteria applied by act 101, which forms restricted library 14.

If the criteria applied by act 101 are overly restrictive, circuit design 16 may not be satisfactory in terms of meeting design objectives or goals. In some embodiments, the process 100 includes an iterative process including act 111, which evaluates circuit design 16 against one more goals. Act 111 is illustrated as occurring after finishing design flow 109, but in some embodiments act 111 can be executed before completing the operations of finishing design flow 109. If act 111 determines that one or more goals are not met, process 100 proceeds to act 113, modifying the efficiency criteria applied by act 101 to reduce the number of cells that are excluded and repeating act 101 to produce a new and expanded version of restricted cell library 14.

In some embodiments, act 113 includes modifying a threshold for an efficiency metric that is part of the efficiency criteria applied by act 101. For example, Table 1 shows a threshold value of 0.1 applied against the metric maxΔ|delay|/Δarea. Act 113 could reduce the threshold to 0.050, whereby the cell AN2D8 would no longer be excluded from the restricted cell library 14. In some embodiments, act 101 considers more than one metric. Accordingly, in some embodiments act 113 modifies more than one threshold.

In some embodiments, act 101 uses an efficiency metric but does not apply the efficiency metric against a predetermined threshold value. In some embodiments, act 101 uses the efficiency metric to place cells in a hierarchy of efficiency within each cell group. In some embodiments, act 101 selects a fixed number of cells from each cell group, the cells being at the top of the hierarchy. In some embodiments, act 101 selects a certain fraction of cells in each cell group, e.g., the half of the cells in the group that are most efficient. In some embodiments act 113 increases by a fixed amount the number of cells in each cell group that are selected by act 101 for the restricted library 14. In some embodiments, act 113 increased the percentage or fraction of cells in each cell group that are selected by act 101 for the restricted library 14.

In some embodiments, act 101 uses the efficiency metric to place cells within each cell group into bins, each bin corresponding to a range of values for the efficiency metric. Act 113 can then increase the number of bins that are selected for inclusion in the restricted library 14. This latter approach can be particularly useful when act 101 considers a plurality of efficiency metrics.

In some embodiments, act 101 applies a plurality of criterion. For example, act 101 may provide an ordering of cells in each cell group according to area-efficiency and an ordering according to leakage-efficiency. Thresholds for inclusion in the restricted library 14 can be provided for each of these metrics. Act 113 can modify the threshold for one metric, for both metrics, or for alternating metrics. In some embodiments, a plurality of criteria are applied to arrange the cells within a cell group into a matrix of bins, each row or column of the matrix corresponding to a range of values for one of the efficiency metrics. Act 101 can select a certain number or fraction of the bins for restricted cell library 14, and act 113 can increase the number or fraction of the bins that are included in restricted cell library 14.

Figure 6:
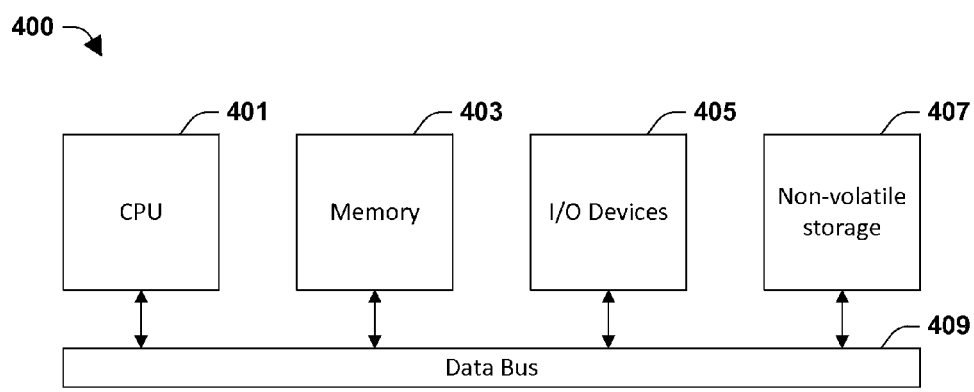
FIG. 6 is a schematic illustration of an example computer system suitable for implementing the process of FIG. 1.

The process 100 can be implemented by a computer system or by a human operator with the assistance of a computer system. FIG. 6 illustrates an example computer system 400 suitable for implementing the process 100. The computer system 400 includes one or more central processing units 401 (CPUs), a memory 403, input and output (I/O) devices 405, and non-volatile storage 407. These are shown as communicating over a data bus 409. Optionally, one or more components can communicate over a local or wide area network.

Computer system 400 hosts an electronic integrated circuit design program. Computer system 400 is programmed with instructions and is therefore functional to carry out the design operation of act 105. In some embodiments, computer system 400 is programmed with instructions for forming the restricted cell library 14. In some embodiments, computer system 400 is programmed with instructions for carrying out process 100 in its entirety. Digital representations of the cell libraries can be stored in files on the computer system 400.

In some embodiments, non-volatile storage 407 stores program instructions for carrying out act 105. In some embodiments, non-volatile storage 407 stores program instructions for forming the restricted cell library 14. In some embodiments, non-volatile storage 407 stores program instructions for carrying out the entire process 100. In any of these embodiments, non-volatile storage 407 can be provided separately from computer system 400. In these various embodiments, non-volatile storage 407 can be introduced to the other components of computer system 400 to enable that system to form the restricted library 14, to execute the design operation of act 105 with cell selections constrained to the restricted cell library 14 as required by act 105, or to carry out the entire process 100.

In some embodiments, process 100 is implemented using commercially or publically available software that does not include the functionality of act 101, selecting efficient cells from cell library 12 to form restricted cell library 14. In these embodiments, a user or user provided software forms the restricted cell library 14 and instructs the commercially or publically available software to perform the design operation of act 105 using the restricted cell library 14.

The present disclosure provides an electronic design automation system including a computer system, an electronic integrated circuit design program installed on the computer system, a first cell library stored on the computer system, and software instructions stored on the computer system. The software instructions are functional to form a restricted cell library from the first cell library by selecting only the most efficient cells and to execute an integrated circuit design operation of a type that is functional to select cells for an integrated circuit design from the first cell library. The software instructions limit the cell selections made by the integrated circuit design operation to cells in the restricted cell library. Selecting the most efficient cells includes excluding cells that have a functionality that is duplicated by one or more other cells in the first cell library. The cells selected for the restricted cell library have a higher efficiency than the excluded cells with respect to an efficiency criteria.

The disclosure provides a method of designing an integrated circuit. The method includes forming a restricted cell library from a first cell library by selecting only those cells in the first cell library that are most efficient according to a predetermined efficiency criteria and executing an integrated circuit design operation in an electronic design automation program while directing the electronic design automation program to make cell selections exclusively from the restricted cell library. The integrated circuit design operation is one that can be directed to make cell selections from any of the cells in the first cell library without changing its essential purpose.

The present disclosure provides a method of operating an electronic design automation system. The method includes specifying a circuit using a hardware description language (HDL), selecting one or more cell libraries, forming a restricted cell library from one of the cell libraries by selecting cells on the basis of efficiency criteria, instructing the electronic design automation to execute one or more design operations to provide a circuit design conforming to the circuit specification, and for a particular one of the operations, instructing the electronic design automation system to make cell selections only from the restricted cell library.

The components and features of the present disclosure have been shown and/or described in terms of certain embodiments and examples. While a particular component or feature, or a broad or narrow formulation of that component or feature, may have been described in relation to only one embodiment or one example, all components and features in either their broad or narrow formulations may be combined with other components or features to the extent such combinations would be recognized as logical by one of ordinary skill in the art.

The invention claimed is:

1. A method of designing an integrated circuit, comprising:
forming by at least one processor a first restricted cell library from a cell library stored on a non-transitory computer readable medium by selecting only those cells in the cell library that are most efficient according to a first predetermined efficiency criteria, wherein forming the first restricted cell library from the cell library comprises:
dividing the cells in the cell library into groups such that each cell in a group has the same function;
placing the cells in bins within a matrix having one or more dimensions, each dimension of the matrix corresponding to a discrete efficiency metric, and each index value for the dimension corresponding to a discrete range of values for the discrete efficiency metric; and
selecting the cells from some but not all of the occupied bins for inclusion in the first restricted cell library;
executing by the at least one processor an integrated circuit design operation in an electronic design automation program while directing the electronic design automation program to make cell selections exclusively from the first restricted cell library; and
manufacturing a final integrated circuit design resulting from the integrated circuit design operation;
wherein the integrated circuit design operation is selectively configured to make the cell selections from any of the cells in the first restricted cell library during its execution.

2. The method of claim 1, further comprising executing an incremental optimization of the integrated circuit design operation in the electronic design automation program while directing the electronic design automation program to make cell selections directly from the cell library.

3. The method of claim 1, further comprising:
determining that a circuit design that results from executing the integrated circuit design operation in the electronic design automation program is unsatisfactory;
forming a second restricted cell library from the cell library by selecting only those cells in the cell library that are most efficient according to a second predetermined efficiency criteria, wherein the second predetermined efficiency criteria causes a second number of cells to be selected for the second restricted cell library, and wherein the second number is larger than a first number of cells that were selected for the first restricted cell library; and
executing again the integrated circuit design operation in the electronic design automation program while directing the program to make cell selections exclusively from the second restricted cell library.

4. The method of claim 1, wherein forming the first restricted cell library from the cell library comprises applying an efficiency metric to each of the cells in the cell library and selecting only those cells that exceed a threshold value for that efficiency metric.

5. The method of claim 1, wherein the matrix has two or more dimensions.

6. The method of claim 1, wherein forming the first restricted cell library from the cell library comprises:
dividing the cells in the cell library into the groups such that each cell in the group has the same function but a different current drive; and
selecting cells from each group for inclusion in the first restricted cell library according to an efficiency metric that determines efficiency by comparison with a cell in the same group having lower current drive.

7. The method of claim 1, wherein the integrated circuit design operation is selected from the group consisting of synthesis, placement, and routing.

8. The method of claim 1, wherein the integrated circuit design operation is an optimization stage.

9. A method of operating an electronic design automation system, comprising:
receiving by at least one processor a circuit specification defined using a hardware description language (HDL);
dividing by the at least one processor the circuit specification into a plurality of regions, wherein at least one region includes a plurality of cells;
selecting by the at least one processor a cell library;
forming by the at least one processor a restricted cell library from the cell library by selecting cells of the cell library on the basis of efficiency criteria, wherein forming the restricted cell library includes evaluating the efficiency criteria for the cells of the cell library by comparing the cells of the cell library to corresponding reference cells, wherein the reference cells are individual cells in the cell library;
instructing by the at least one processor the electronic design automation system to individually process the plurality of regions to provide a circuit design conforming to the circuit specification, wherein the processing includes executing one or more design operations on the plurality of regions; and
for a particular one of the one or more design operations, instructing by the at least one processor the electronic design automation system to make cell selections from the restricted cell library;
wherein a final integrated circuit design resulting from the method is manufactured.

10. The method of claim 9, wherein:
the particular one of the one or more design operations comprises logic level optimization; and
the particular one of the one or more design operations is followed by a gate-level optimization in which cell selections are made from the cell library from which the restricted cell library is formed, but without restricting the cell selections to the restricted cell library.

11. The method of claim 9, further comprising:
rejecting the circuit design;
reforming the restricted cell library to include more cells from the cell library, wherein the reformed cell library is a superset of the restricted cell library and a proper subset of the cell library;
instructing the electronic design automation system to re-execute the one or more design operations to provide another circuit design conforming to the circuit specification; and
for the particular one of the one or more design operations, instructing the electronic design automation system to make cell selections from the reformed cell library.

12. The method of claim 9, wherein forming the restricted cell library from the cell library comprises selecting a subset of the cells in the cell library that are most efficient in terms of a criteria that is an area-specific efficiency, a power-specific efficiency, or a performance-specific efficiency.

13. The method of claim 9, wherein forming the restricted cell library comprises:
dividing the cell library into groups by function, such that the groups each have one or more cells sharing a common function;
determining corresponding efficiency values for the cells of the cell library based on the efficiency criteria;
ordering the cells of the cell library by the corresponding efficiency values to define cell hierarchies individual to the groups; and
selecting a predetermined number or fraction of cells from each of the groups for inclusion in the restricted cell library, wherein the predetermined number or fraction of cells are the most efficient in the cell hierarchies.

14. The method according to claim 9, wherein forming the restricted cell library comprises:
dividing the cell library into groups by function, such that the groups each have one or more cells sharing a common function, wherein the groups include a group with a plurality of cells;
ordering the plurality of cells of the group by a first cell parameter to define a cell hierarchy for the group;
determining a difference between a first value of a second cell parameter for a cell of the group and a second value of the second cell parameter for the corresponding reference cell; and
calculating an efficiency value for the cell based on the difference.

15. The method according to claim 9, further comprising:
dividing the cell library into groups by function and a performance requirement parameter, wherein each group comprises a unique combination of a function and a value range of the performance requirement parameter, wherein the reference cells are individual to the groups, and wherein forming the restricted cell library includes selecting a cell from each group.

16. A method of operating an electronic design automation system, comprising:
receiving or providing by at least one processor a cell library including a plurality of cells, wherein the plurality of cells have a plurality of cell efficiency values, respectively, wherein the cell efficiency values differ from one another, wherein the cell library is stored on a computer system, which has a non-transitory storage medium installed with an electronic integrated circuit design program;
selectively including by the at least one processor only those cells whose corresponding efficiency values have a predetermined relationship with a predetermined efficiency threshold into a restricted cell library, while excluding other cells whose corresponding efficiency values do not have the predetermined relationship with the predetermined efficiency threshold from the restricted cell library;
generating by the at least one processor an initial integrated circuit design from a design specification and using the restricted cell library, wherein the design specification is a functional description of an integrated circuit;
determining by the at least one processor whether the initial integrated circuit design, as generated, meets a design goal;
based on whether the initial integrated circuit design meets the design goal, selectively generating by the at least one processor a refined library and selectively generating by the at least one processor a refined integrated circuit design using the refined library, wherein the refined library is a superset of the restricted cell library and a proper subset of the cell library; and
manufacturing the initial or refined integrated circuit design.

17. The method of claim 16, wherein the respective cell efficiency values of the respective cells are determined based on respective ratios of respective timing delays of the respective cells to respective areas or respective leakage currents of the respective cells.

18. The method of claim 16, wherein those cells which are selected have a functionality that is duplicated by the other cells which are excluded, and those cells included in the restricted cell library have higher efficiency values than the excluded cells.

19. The method according to claim 16, further comprising calculating the plurality of cell efficiency values by:
dividing the cell library into groups by function, such that the groups each have one or more cells sharing a common function, wherein the groups include a group with a plurality of cells;
ordering the plurality of cells of the group by a first cell parameter to define a cell hierarchy for the group;
determining a difference between a first value of a second cell parameter for a first cell of the group and a second value of the second cell parameter for a second cell of the group that immediately neighbors the first cell in the cell hierarchy; and
calculating an efficiency value for the first cell based on the difference.

20. The method according to claim 16, further comprising calculating the plurality of cell efficiency values by:
dividing the cell library into groups by function, such that the groups each have one or more cells sharing a common function, wherein the groups include first and second groups respectively having a plurality of cells;
ordering the plurality of cells of the first and second groups by a first cell parameter to respectively define first and second cell hierarchies for the first and second groups;
determining a difference between a first value of a second cell parameter for a first cell of the first group and a second value of the second cell parameter for a second cell of the second group that has a location in the second cell hierarchy corresponding to a location of the first cell in the first cell hierarchy; and
calculating an efficiency value for the first cell based on the difference.

* * * * *